US009205999B2

(12) United States Patent
Woods et al.

(10) Patent No.: US 9,205,999 B2
(45) Date of Patent: Dec. 8, 2015

(54) EXHAUST DUST COLLECTOR FOR A PARTICULATE LOADER

(71) Applicants: Kent Gregory Woods, Swift Current (CA); Joseph Robert Parisien, Swift Current (CA); Paul Kerr, Hodgeville (CA)

(72) Inventors: Kent Gregory Woods, Swift Current (CA); Joseph Robert Parisien, Swift Current (CA); Paul Kerr, Hodgeville (CA)

(73) Assignee: AG GROWTH INDUSTRIES PARNERSHIP, Winnipeg, Manitoba (CA)

( * ) Notice: Subject to any disclaimer, the term of this patent is extended or adjusted under 35 U.S.C. 154(b) by 0 days.

(21) Appl. No.: 14/157,827

(22) Filed: Jan. 17, 2014

(65) Prior Publication Data

US 2015/0147124 A1 May 28, 2015

(30) Foreign Application Priority Data

Nov. 22, 2013 (CA) ...................................... 2834121

(51) Int. Cl.
*B65G 53/24* (2006.01)
*B65G 53/64* (2006.01)

(52) U.S. Cl.
CPC ...................................... *B65G 53/64* (2013.01)

(58) Field of Classification Search
USPC ......... 406/41, 42, 53, 151, 166, 173; 209/147
See application file for complete search history.

(56) References Cited

U.S. PATENT DOCUMENTS

| | | | | |
|---|---|---|---|---|
| 1,340,164 | A * | 5/1920 | Golloher | 406/151 |
| 4,111,670 | A * | 9/1978 | DeMarco | 55/315 |
| 4,433,946 | A * | 2/1984 | Christianson et al. | 406/43 |
| 4,580,928 | A * | 4/1986 | Van Abbema | 406/109 |
| 4,662,800 | A * | 5/1987 | Anderson et al. | 406/53 |
| 5,163,786 | A * | 11/1992 | Christianson | 406/41 |
| 5,341,856 | A * | 8/1994 | Appenzeller | 141/67 |
| 5,428,864 | A * | 7/1995 | Pemberton | 15/348 |
| 5,575,596 | A * | 11/1996 | Bauer et al. | 406/168 |
| 6,089,795 | A * | 7/2000 | Booth | 406/43 |
| 6,110,242 | A * | 8/2000 | Young | 55/337 |
| 6,223,387 | B1 * | 5/2001 | Anderson | 15/340.1 |
| 6,634,833 | B2 * | 10/2003 | Gillespie | 406/84 |
| 6,974,279 | B2 * | 12/2005 | Morohashi et al. | 406/173 |
| 7,431,537 | B2 | 10/2008 | Francis et al. | |
| 7,537,418 | B2 * | 5/2009 | Deal et al. | 406/12 |
| 7,547,162 | B2 * | 6/2009 | Rempel | 406/53 |
| 8,051,986 | B2 * | 11/2011 | Lees | 209/139.1 |
| 8,113,353 | B2 * | 2/2012 | Redekop et al. | 209/137 |
| 2005/0095070 | A1* | 5/2005 | Wysong | 406/39 |
| 2013/0220893 | A1* | 8/2013 | Sukkar | 209/147 |

* cited by examiner

*Primary Examiner* — Joseph Dillon, Jr.
(74) *Attorney, Agent, or Firm* — Thompson Hine LLP

(57) ABSTRACT

A particulate loader for transferring particulates. The particulate loader comprises an air-particulates separating chamber for separating the particulates from an air stream caused by suction provided thereto. A suction mechanism is connected to the air-particulates separating chamber for providing the suction thereto by removing air from the air-particulates separating chamber and exhausting the air. A conveying mechanism is connected to the air-particulates separating chamber for conveying the separated particulates from the air-particulates separating chamber to a remote location. The cyclone has an inlet connected to an exhaust outlet of the suction mechanism, an air outlet for discharging the air after separating the dust therefrom, and a dust outlet for discharging the collected dust.

15 Claims, 15 Drawing Sheets

EXHAUST DUST COLLECTOR FOR A PARTICULATE LOADER

This application claims priority to Canadian Patent Application No. 2,834,121, entitled EXHAUST DUST COLLECTOR FOR A PARTICULATE LOADER, filed on Nov. 22, 2013 in the name of REM Enterprises Inc. with Kent Woods, Joseph Parisien and Paul Kerr as inventors. The entire contents of that application are incorporated by reference herein.

FIELD

The present invention relates to a high capacity particulate loader and transfer apparatus for grains, fertilizers, chemicals, particulates and granular material (hereinafter referred to as "particulates"), and more particularly, relates to an exhaust dust collector for a particulate loader and transfer apparatus.

BACKGROUND

Particulate loader and transfer devices are well known, and as described in U.S. Pat. No. 7,431,537, are used by farmers and others to load and transfer grain and other particulate material in a convenient manner. These devices include a suction mechanism such as, for example, an air vacuum pump, fan or blower (hereinafter referred to as "air vacuum pump") to create suction within an air-particulates separation chamber and a vacuum pickup hose attached thereto to transport grain or other material from a first remote location into the air-particulates separation chamber. The particulates then settle and accumulate in the bottom of the air-particulates separation chamber where a first end of a conveying mechanism such as, for example, an auger is positioned for transferring the grain or other particulates from the air-particulates separation chamber to a second remote location such as, for example a truck or container.

State of the art particulate loaders have a restricting device such as, for example, a screen or drum of a generally perforated nature disposed within the air-particulates separating chamber for restricting passage of the particulate material to the fan or blower. Typically, the drum is affixed to a fore-and-aft extending shaft about whose axis the drum is rotated during operation. Air drawn through the air-particulates separating chamber passes through the drum's perforations, the drum's perforations thereby restricting passage of the particulates therethrough, leaving the particulates in the air-particulates separating chamber while the air which has passed through the perforations in the drum is exhausted through the suction mechanism of the particulate loader to the outside, typically in close proximity to the particulate loader. Alternative separating devices employed are, for example, large screen hole separation and inserted cone shape devices.

The perforations are designed such they are small enough that passage of the particulate material therethrough is substantially prevented but are also large enough to provide sufficient suction and to prevent blockage thereof, in order to enable efficient and reliable operation of the particulate loader. Consequently, the size of the perforations enables small particles such as, for example, dust and smaller pieces of the particulates—for example, pieces of grain chaff—(hereinafter referred to as "dust") to pass through to the suction mechanism of the particulate loader and, ultimately, to the outside, creating a substantial safety and health risk for a person in proximity of the particulate loader as well as substantial pollution of the environment.

It may be desirable to provide an exhaust dust collector for a particulate loader that substantially separates and collects the dust from the exhaust air stream prior to the release of the exhaust air stream into the environment.

It also may be desirable to provide an exhaust dust collector for a particulate loader that substantially separates and collects the dust from the exhaust air stream in a continuous fashion during operation of the particulate loader.

It also may be desirable to provide an exhaust dust collector for a particulate loader that is simple, and is implementable absent substantial changes to an existing particulate loader design.

It also may be desirable to provide an exhaust dust collector for a high capacity particulate loader that is sufficiently compact for enabling provision of the high capacity particulate loader with the exhaust dust collector mounted on a mobile device with the mobile device having dimensions within the limits for using public roads.

SUMMARY

Accordingly, one object of the present invention is to provide an exhaust dust collector for a particulate loader that substantially separates and collects the dust from the exhaust air stream prior to the release of the exhaust air stream into the environment.

Another object of the present invention is to provide an exhaust dust collector for a particulate loader that substantially separates and collects the dust from the exhaust air stream in a continuous fashion during operation of the particulate loader.

Another object of the present invention is to provide an exhaust dust collector for a particulate loader that is simple, and is implementable absent substantial changes to an existing particulate loader design.

Another object of the present invention is to provide an exhaust dust collector for a high capacity particulate loader that is sufficiently compact for enabling provision of the high capacity particulate loader with the exhaust dust collector mounted on a mobile device with the mobile device having dimensions within the limits for using public roads.

According to one aspect of the present invention, there is provided a particulate loader for transferring particulates. The particulate loader comprises an air-particulates separating chamber for separating the particulates from an air stream caused by suction provided thereto. A suction mechanism is connected to the air-particulates separating chamber for providing the suction thereto by removing air from the air-particulates separating chamber and exhausting the air. A conveying mechanism is connected to the air-particulates separating chamber for conveying the separated particulates from the air-particulates separating chamber to a remote location. The cyclone has an inlet connected to an exhaust outlet of the suction mechanism, an air outlet for discharging the air after separating the dust therefrom, and a dust outlet for discharging the collected dust.

An advantage of the present invention is that it provides an exhaust dust collector for a particulate loader that substantially separates and collects the dust from the exhaust air stream prior to the release of the exhaust air stream into the environment.

A further advantage of the present invention is that it provides an exhaust dust collector for a particulate loader that substantially separates and collects the dust from the exhaust air stream in a continuous fashion during operation of the particulate loader.

A further advantage of the present invention is that it provides an exhaust dust collector for a particulate loader that is simple, and is implementable absent substantial changes to an existing particulate loader design.

A further advantage of the present invention is that it provides an exhaust dust collector for a high capacity particulate loader that is sufficiently compact for enabling provision of the high capacity particulate loader with the exhaust dust collector mounted on a mobile device with the mobile device having dimensions within the limits for using public roads.

BRIEF DESCRIPTION OF THE DRAWINGS

An embodiment of the present invention is described below with reference to the accompanying drawings, in which.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

Figure 1A:
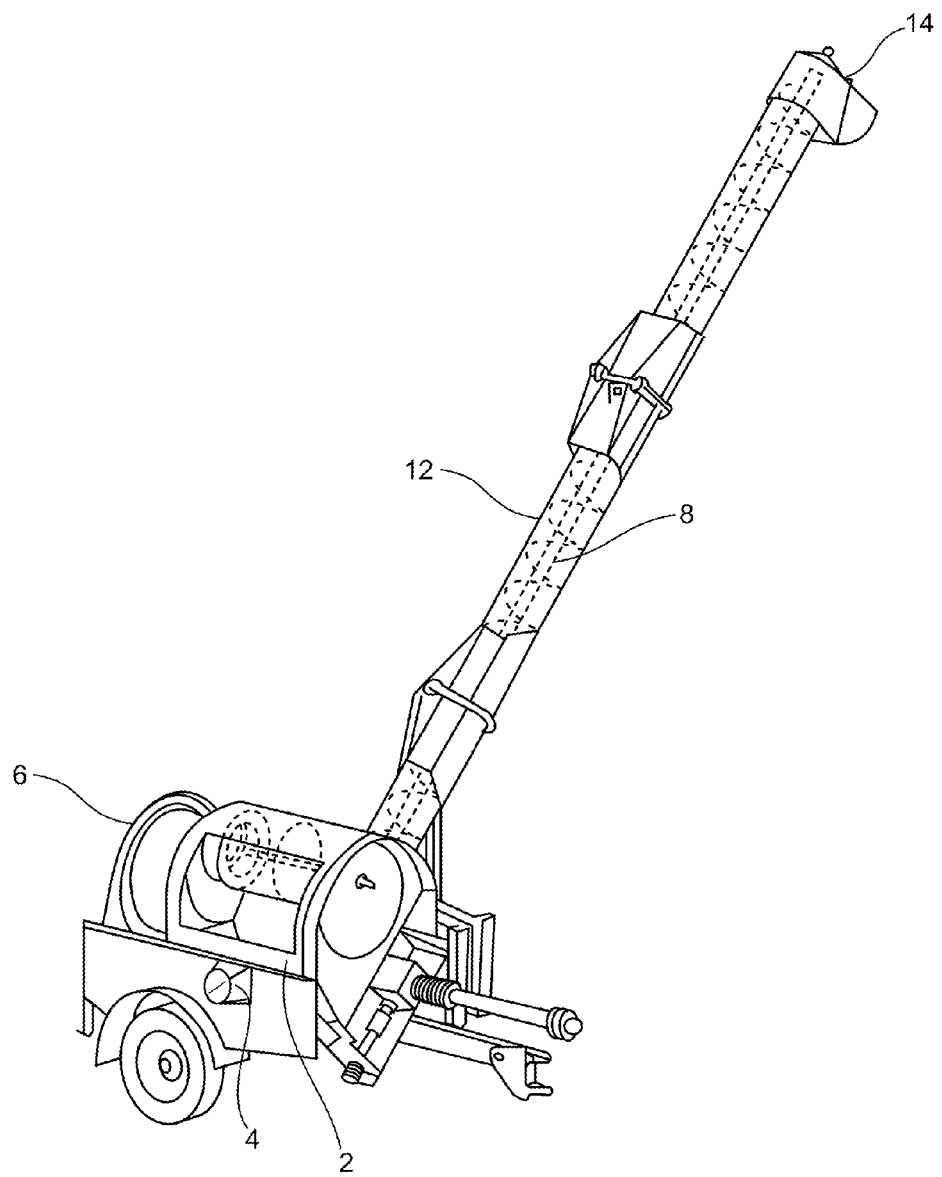
FIGS. 1a and 1b are simplified block diagrams illustrating a front perspective view and a rear perspective view, respectively, of a state of the art particulate loader and transfer apparatus.
Figure 1B:
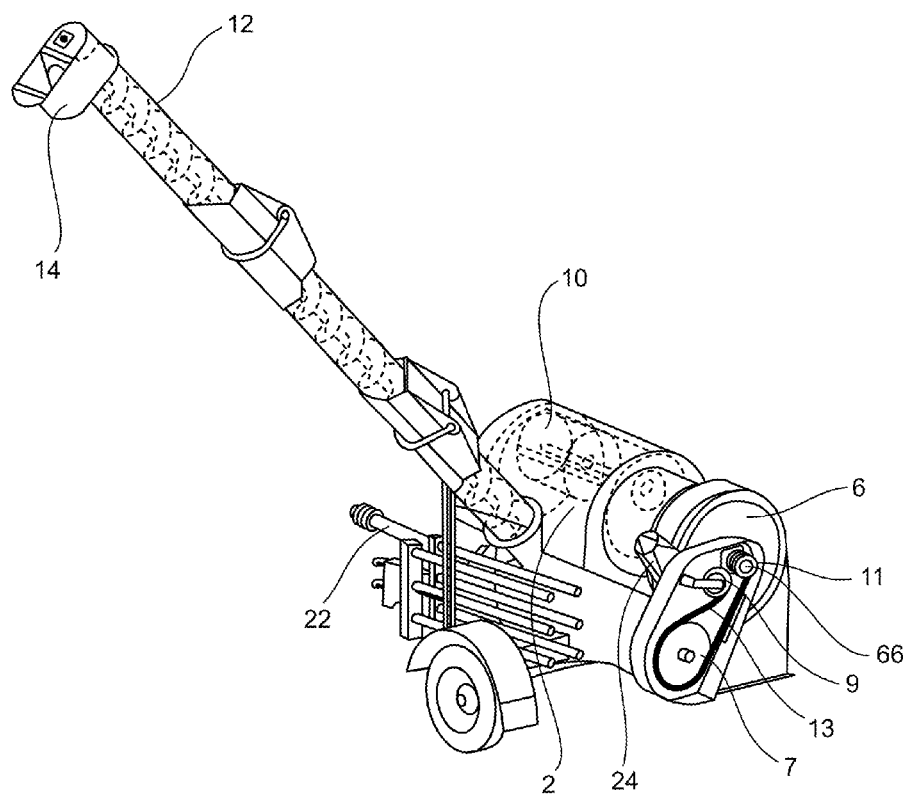

While the description of the embodiments herein below is with reference to a particulate loader as illustrated in FIGS. 1a and 1b, it will become evident to those skilled in the art that the embodiments of the invention are not limited thereto, but are also applicable for other types of particulate loaders using, for example, different separating means, suction mechanisms, particulate conveying mechanisms, and drive mechanisms.

Referring to FIGS. 1a and 1b, a state of the art particulate loader and transfer apparatus is illustrated. In the particulate loader and transfer apparatus, an air-particulates separating chamber 2 is generally provided, having an inlet 4 which is adapted to connect to a vacuum pickup hose (not shown). Relatively low pressure is created within the air-particulates separating chamber 2 and the vacuum pickup hose by way of air vacuum pump 6 in communication with the air-particulates separating chamber 2. The particulates are drawn through the vacuum pickup hose and inlet 4 into the air-particulates separating chamber 2 as a result of the relatively low pressure within the air-particulates separating chamber 2. The particulates thereafter separate from the airflow within the air-particulates separating chamber 2.

State of the art particulate loaders have a restricting device such as restricting drum 10 of a generally perforated nature disposed within the air-particulates separating chamber 2 for restricting passage of the particulate material to the centrifugal air vacuum pump 6. Typically, the drum 10 is affixed to a fore-and-aft extending shaft about whose axis the drum 10 is rotated during operation. Air and dust, drawn into the air-particulates separating chamber 2, pass through the perforations of the drum 10 while passage of the particulates is restricted, leaving the particulates in the air-particulates separating chamber 2 and falling onto auger 8 which extends generally upwardly and outwardly from the air-particulates separating chamber 2 and which auger 8 transports the particulates from the bottom of the air-particulates separating chamber 2, within a tubular auger housing 12 enclosing the auger 8, through an end-dump housing 14 to a waiting truck, container or other particulate material storage area. As illustrated in FIG. 1b, the air vacuum pump 6 is, for example, driven by way of a series of pulleys 7, 9 and 11 and a belt arrangement 13 (in one case driven by a power takeoff (not shown) by way of a drive shaft 22 in a conventional manner), a pulley 11 being secured to the air vacuum pump shaft 66 in a conventional manner to drive the air vacuum pump shaft 66 and centrifugal air vacuum pump 6. The air drawn from the air-material separating chamber 2 by the centrifugal air vacuum pump 6 is exhausted by way of exhaust outlet 24.

Figure 2A:
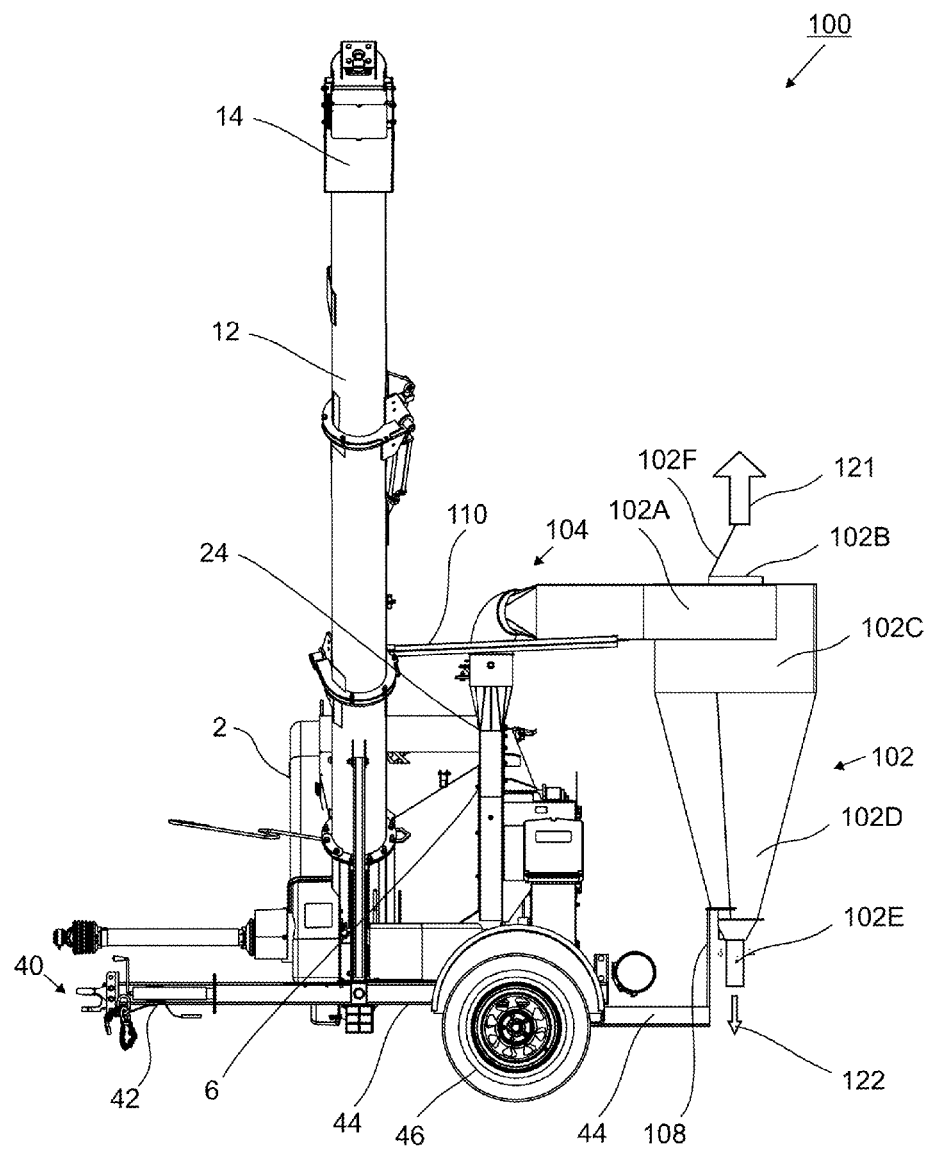
FIGS. 2a and 2b are simplified block diagrams illustrating a side view and a perspective view, respectively, of a particulate loader and transfer apparatus according to an embodiment of the invention.
Figure 2B:
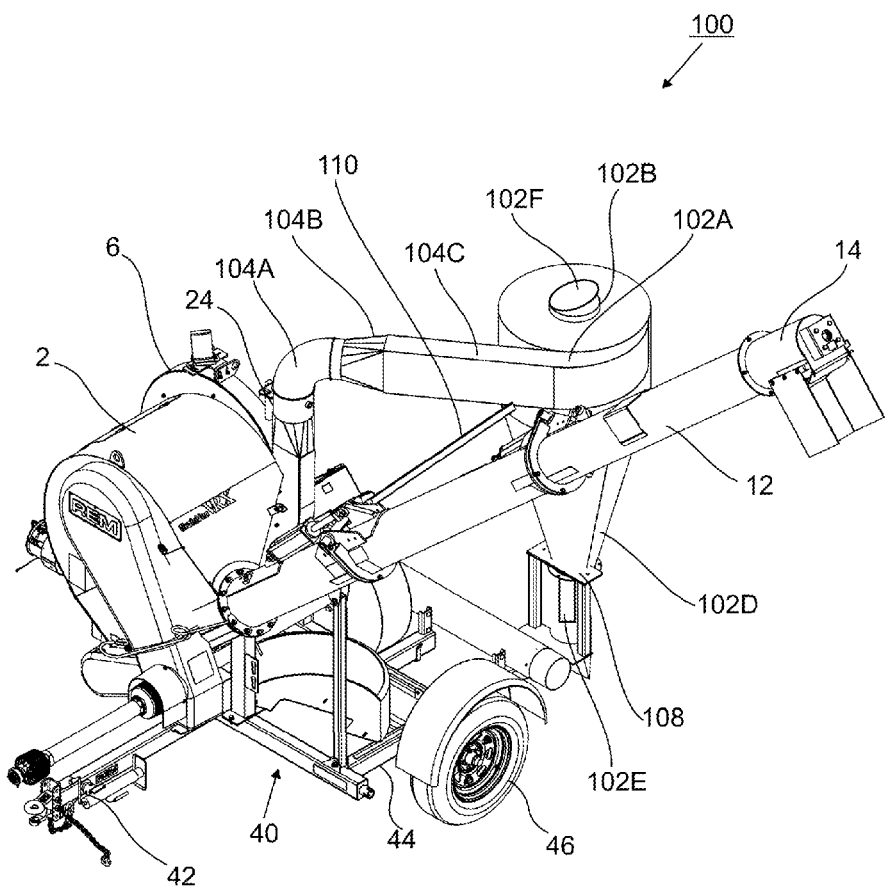
Figure 2C:
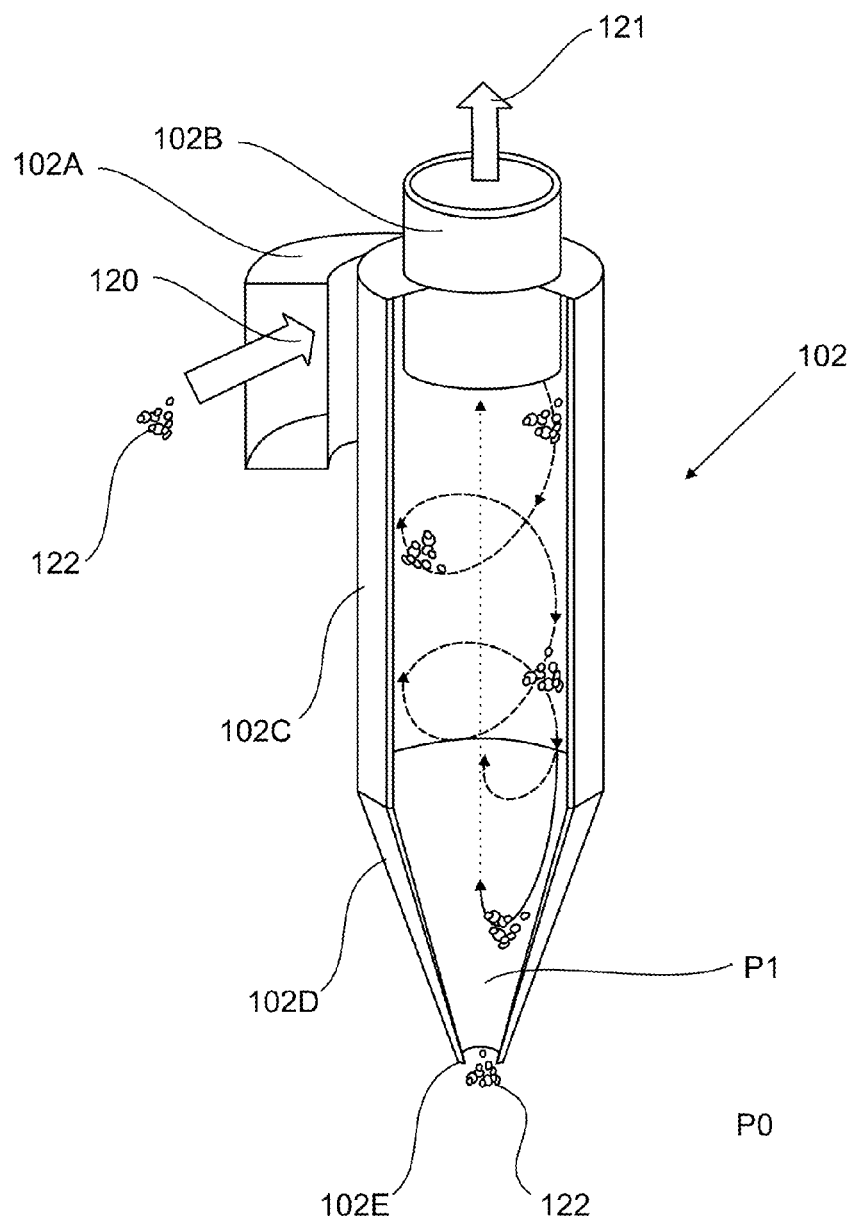
FIG. 2c is a simplified block diagram illustrating a cross-sectional view of a cyclone in operation of the particulate loader according to an embodiment of the invention.

Referring to FIGS. 2a to 2e, a particulate loader and transfer apparatus 100 according to one embodiment of the invention is provided. The particulate loader and transfer apparatus 100 comprises cyclone 102 with cyclone inlet 102A being connected to the exhaust outlet 24 of the air vacuum pump 6 via exhaust conduit 104. The cyclone 102 further comprises: cyclone air outlet 102B; cyclone body 102C; conical cyclone section 102D; and, cyclone dust outlet 102E. In operation, the cyclone 102 separates dust 122 from the exhaust airstream 120, as illustrated in FIG. 2c. The exhaust airstream comprising air 120, as indicated by the block arrow, and dust 122 is received at the inlet 102A. The air 120 and the dust 122 are forced to flow in a helical pattern from the top of the cyclone body 102C to the bottom of the conical section 102D. Due to their inertia, the dust particles 122 are unable to follow the curved air stream, strike the inside wall of the cyclone body 102C and the conical section 102D, and fall towards the bottom of the conical section 102D and, consequently, through cyclone dust outlet 102E. After separation, the cleaned air 121 flows substantially along the center of the cyclone to the top and is exhausted through the cyclone air outlet 102B disposed in the top of cyclone body 102C, as indicated by the block arrow.

Typically, the exhaust airstream is expelled from the exhaust outlet 24 of the air vacuum pump 6 having a substantially high velocity—in the range between 30 mph and 60 mph—causing pressure P1 inside the conical section 102D of the cyclone 102 to be substantially lower than ambient pressure P0, as illustrated in FIG. 2c. Consequently, the lower pressure P1 causes outside air to be drawn into the cyclone 102 through the cyclone dust outlet 102E, inhibiting the discharge of the dust 122 or even inhibiting the separation of the dust 122 from the air stream 120.

Figure 2D:
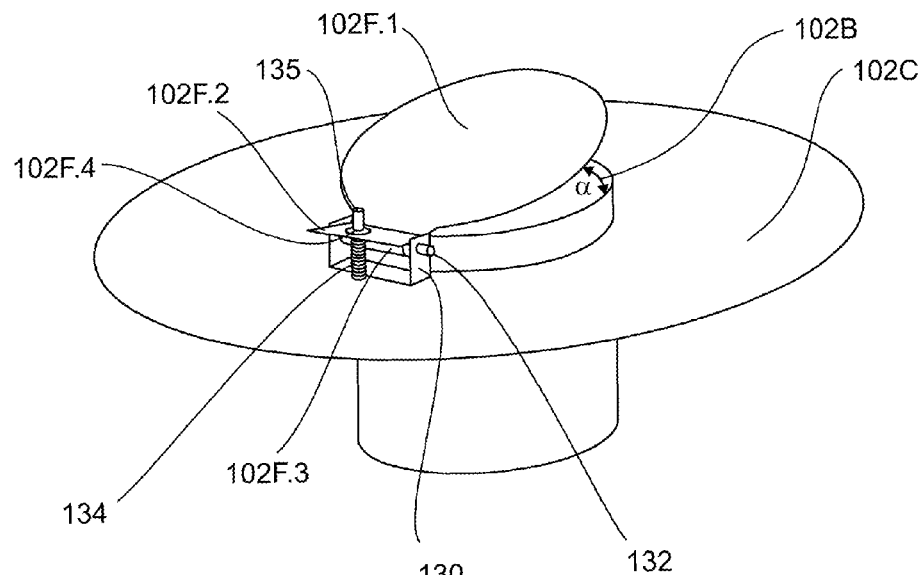
FIGS. 2d to 2g are simplified block diagrams illustrating a perspective view of various implementations of a preloaded cyclone air outlet cover of the particulate loader according to an embodiment of the invention.
Figure 2E:
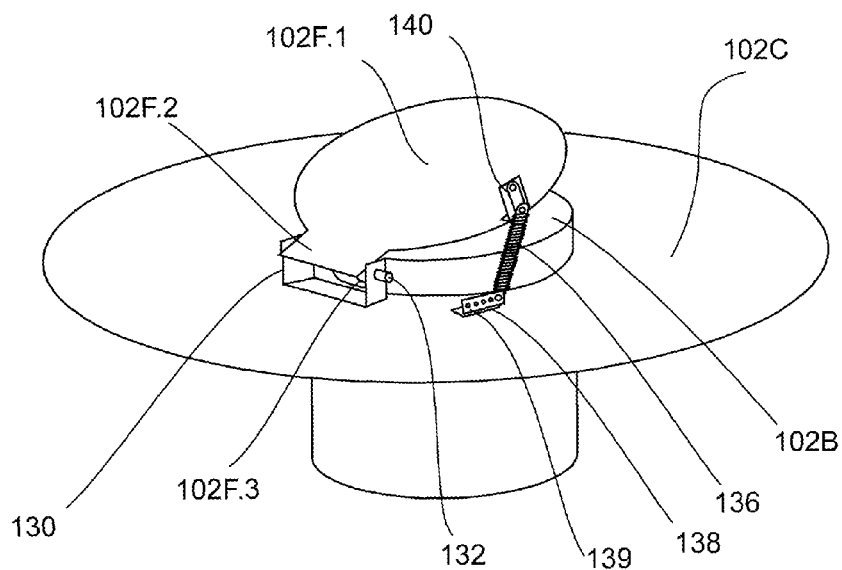
Figure 2F:
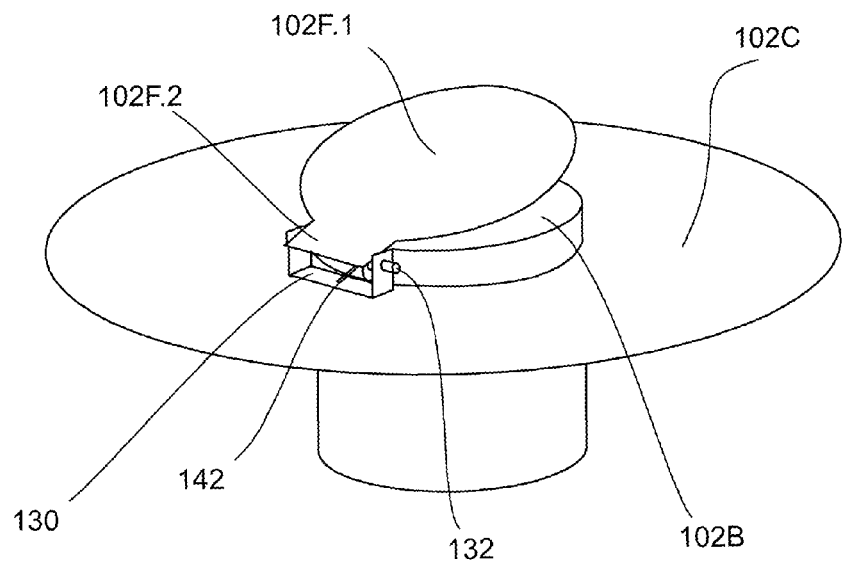
Figure 2G:
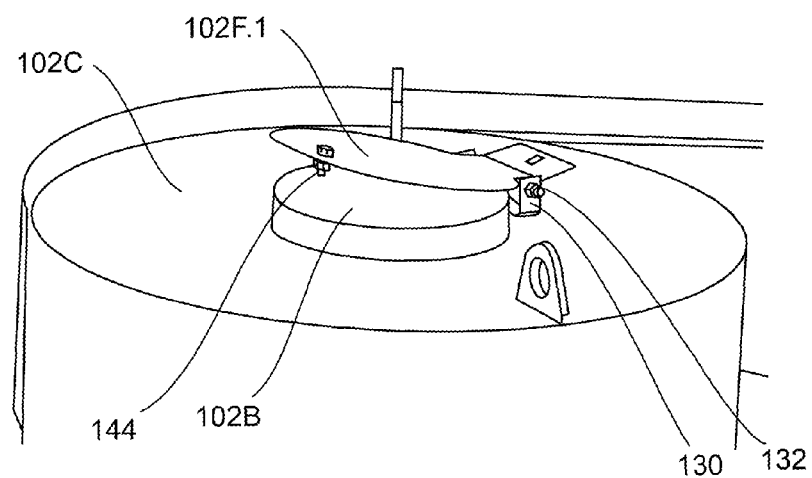

A preloaded cyclone air outlet cover 102F, covering the cyclone air outlet 102B, can be provided with the preload being determined such that air pressure inside the cyclone 102 and consequently the pressure P1 inside the bottom portion of the conical section 102D is sufficiently increased for substantially preventing outside air from being drawn into the cyclone 102 through the cyclone dust outlet 102E. For example, as illustrated in FIGS. 2d to 2g, the preloaded cyclone air outlet cover 102F is provided as a cover plate 102F.1 covering the cyclone air outlet 102B which is pivotally movable mounted to the top of the cyclone body 102C via cover holding element 130. The cover plate 102F.1 is, in one case, made of a sheet material such as, for example, steel or aluminum sheets and mounted to the cover holding element 130 in a conventional manner employing, for example, a bolt 132 accommodated in bore 102F.3 formed of the sheet material of the cover plate 102F.1. The cover holding element 130 is made of, for example, sheet material formed into U-shape and mounted to the top of the cyclone body 102C using screw bolts. Referring to FIG. 2d, the preload is provided using compression spring 134 abutted between the top of the cyclone body 102C and end portion 102F.2 of the cover 102F. Bolt 135, mounted to the top of the cyclone body 102C in a conventional manner, can be provided for guiding the compression spring 134. Elongated aperture 102F.4 is disposed in the end portion 102F.2 for accommodating the bolt 135 therein at different operating positions—angles α—of the cover plate 102F.1 between a closed position—α=0°—and a fully open position—α=90°. Referring to FIG. 2e, the preload is provided using tension spring 136 mounted via holding element 138 to the top of the cyclone body 102C and via holding element 140 to the cover plate 102F.1 in a conventional manner. The holding element 138 can comprise a plurality of bores for accommodating a hook shaped end portion of the tension spring 138 therein with the bores being placed such that the preload of the cover plate 102F.1 is adjustable by inserting the hook shaped end portion of the tension spring 138 in the respective bore 139. Referring to FIG. 2f, the preload is provided using torsion spring 142 disposed on bolt 132 and with end portions thereof being abutted, for example, at the top of the cyclone body 102C and the end portion 102F.2. Referring to FIG. 2g, the preload is provided using weight 144 mounted to the cover plate 102F.1 in a conventional manner using, for example, a screw bolt and a respective screw nut. The preload is adjusted, for example, by changing the weight 144.

Figure 2H:
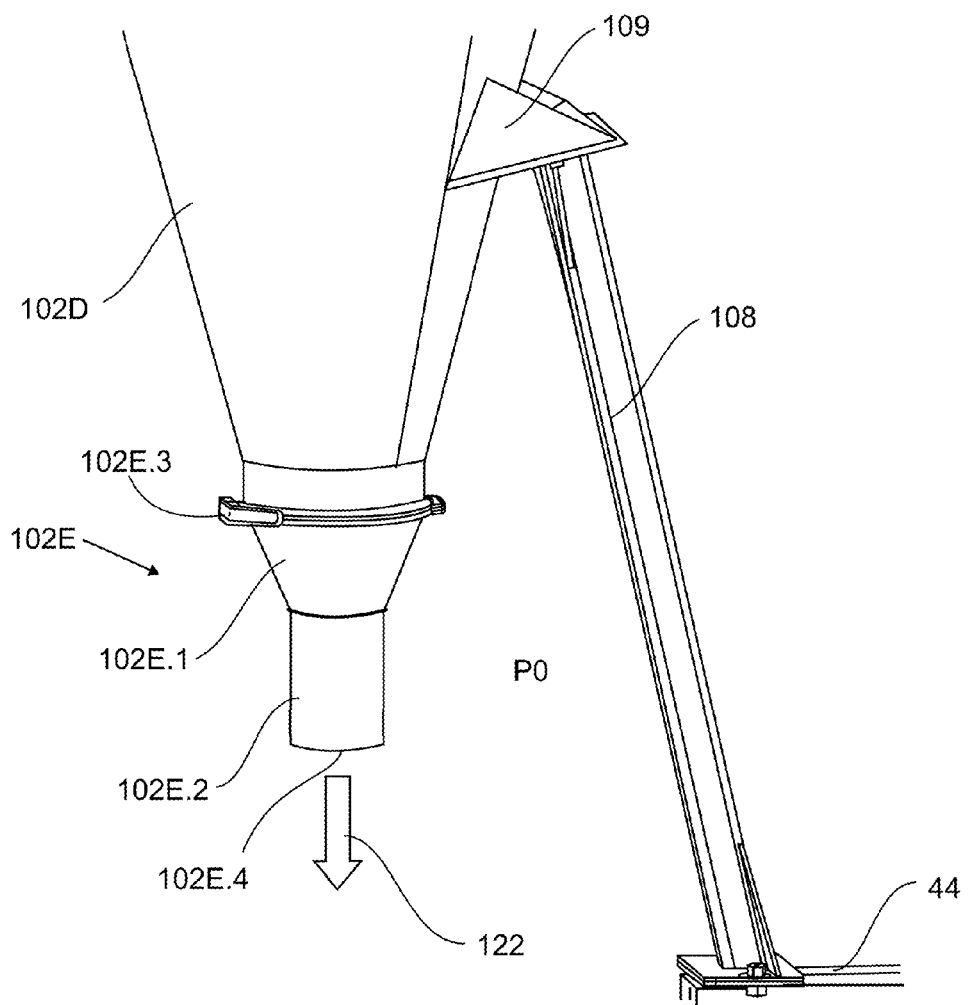
FIG. 2h is a simplified block diagram illustrating a side view of a removable mounted cyclone dust outlet element of the particulate loader according to the an embodiment of the invention.

As illustrated in FIG. 2h, the cyclone dust outlet 102E can be provided as a separate cyclone dust outlet element 102E that is removable mounted to the bottom end of the conical section 102D in a, in one case, substantially sealed fashion. The cyclone dust outlet element 102E is mounted conventional manner using, for example, clamping ring 102E.3 interacting with respective flanges disposed at the bottom end of the conical section 102D and the top end of the cyclone dust outlet element 102E. Optionally, a seal such as, for example, an O-ring, is disposed between the flanges of the conical section 102D and the cyclone dust outlet element 102E. The cyclone dust outlet element 102E comprises dust outlet opening 102E.4 disposed at the bottom end thereof which is, in one case, dimensioned such that it is sufficiently large for discharging a substantial amount of dust 122 being separated during operation of the particulate loader 100 yet sufficiently small to substantially reduce the amount of ambient air—at pressure P0—being drawn into the cyclone 102. The cyclone dust outlet element 102E can comprise a conical section 102E.1 connected to a cylindrical section 102E.2 with the conical section 102E.1 reducing the cross section of the bottom end of the conical section 102D to the cross section of the dust outlet opening 102E.4. Removable attachment of the cyclone dust outlet element 102E enables removal of the same for facilitating cleaning of the cyclone 102, as well as provision of exchangeable cyclone dust outlet elements 102E having different sized cross sections of the dust outlet opening 102E.4 for adapting the dust outlet opening 102E.4 depending, for example, on the particulates handled and the amount of separated dust associated therewith, for example, provision of a smaller sized dust outlet opening 102E.4 when a smaller amount of separated dust is expected.

Figure 3A:
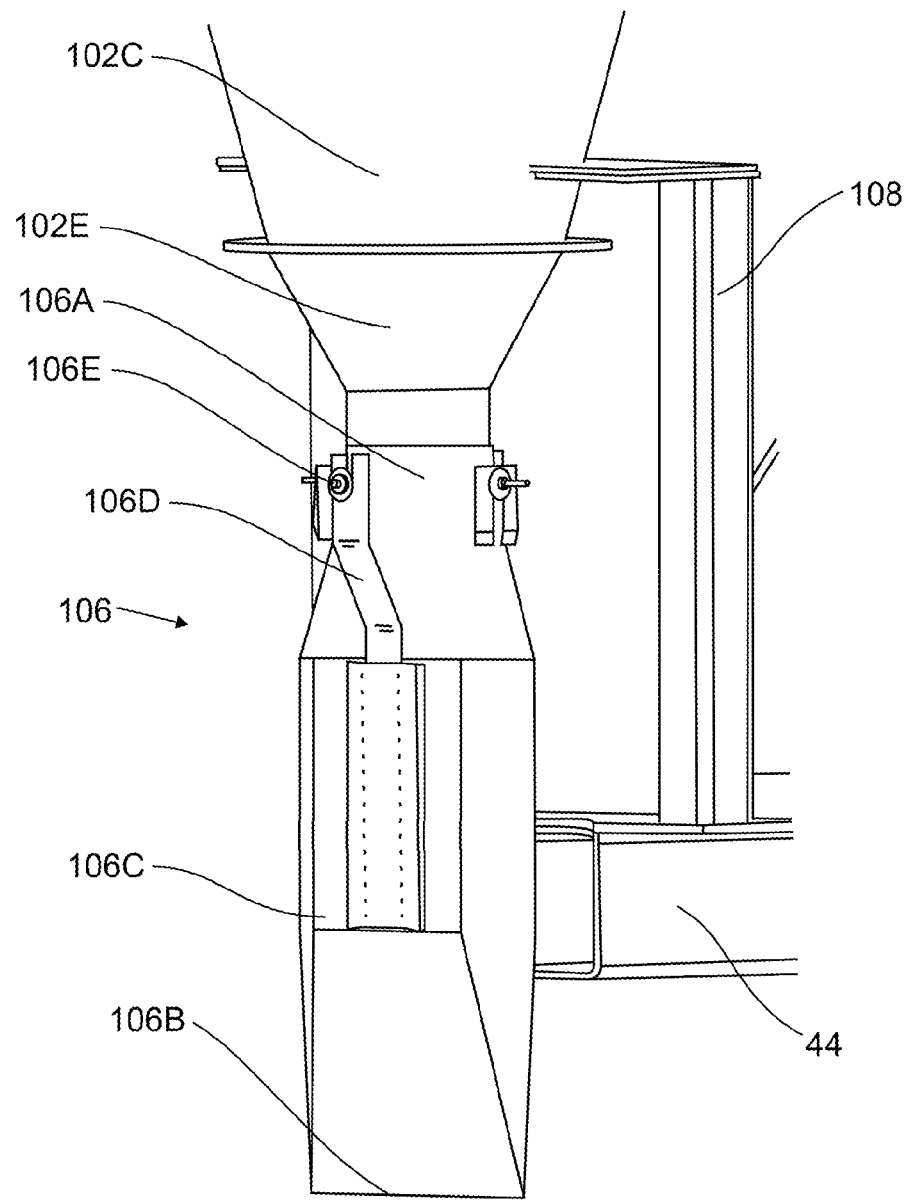
FIG. 3a is a simplified block diagram illustrating a perspective view of the duckbill trickle valve of the particulate loader according to the an embodiment of the invention.
Figure 3B:
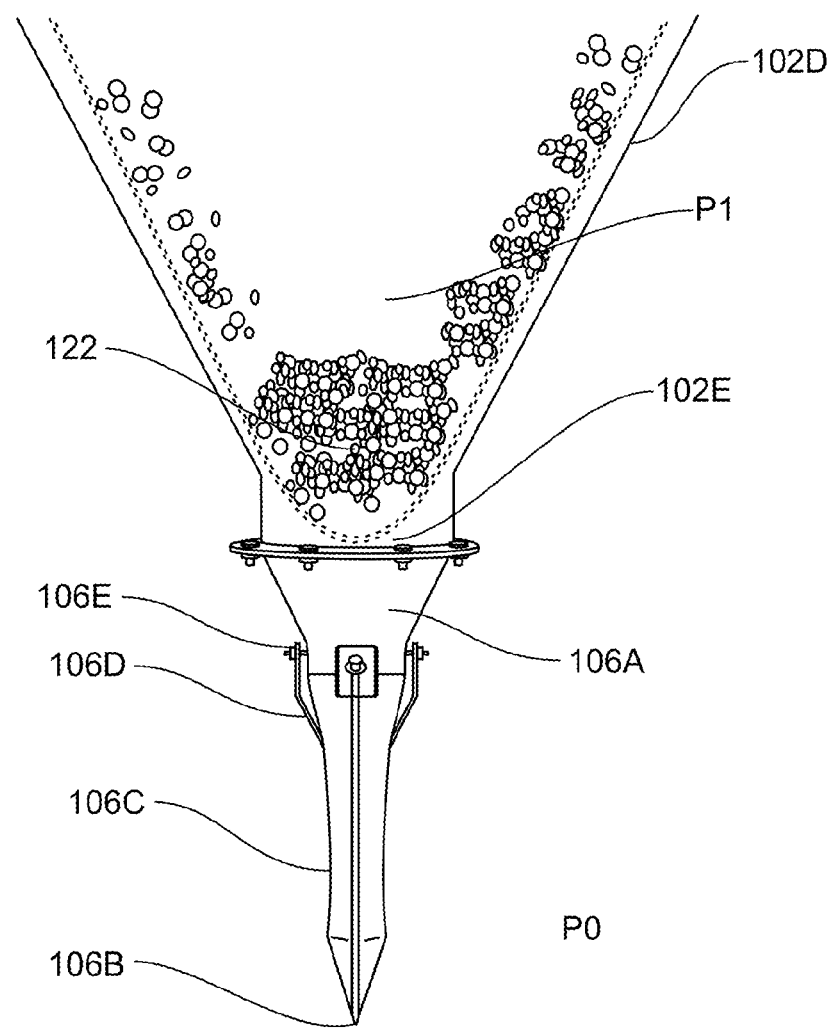
FIGS. 3b and 3c are simplified block diagrams illustrating a partially cross sectional side view of the bottom portion of the cyclone and the duckbill trickle valve in a closed and open position, respectively, of the particulate loader according to an embodiment of the invention.
Figure 3C:
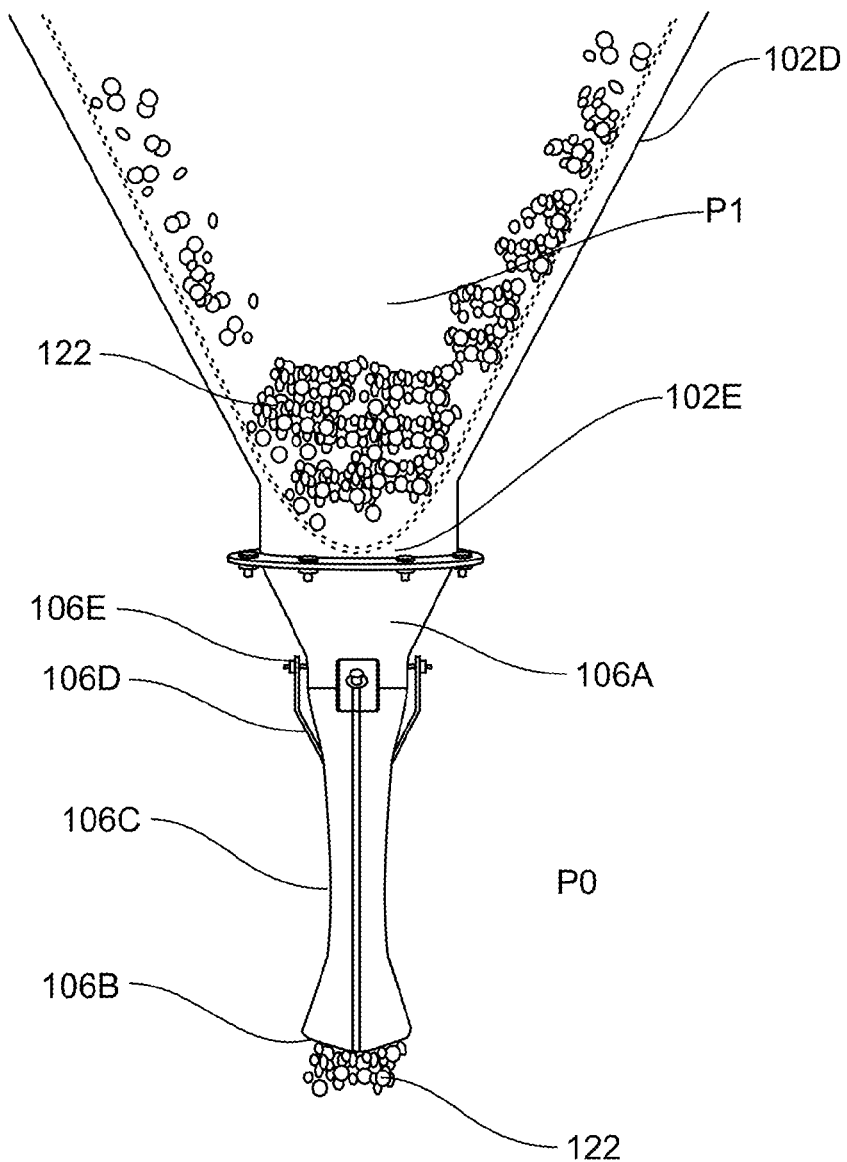
Figure 4A:
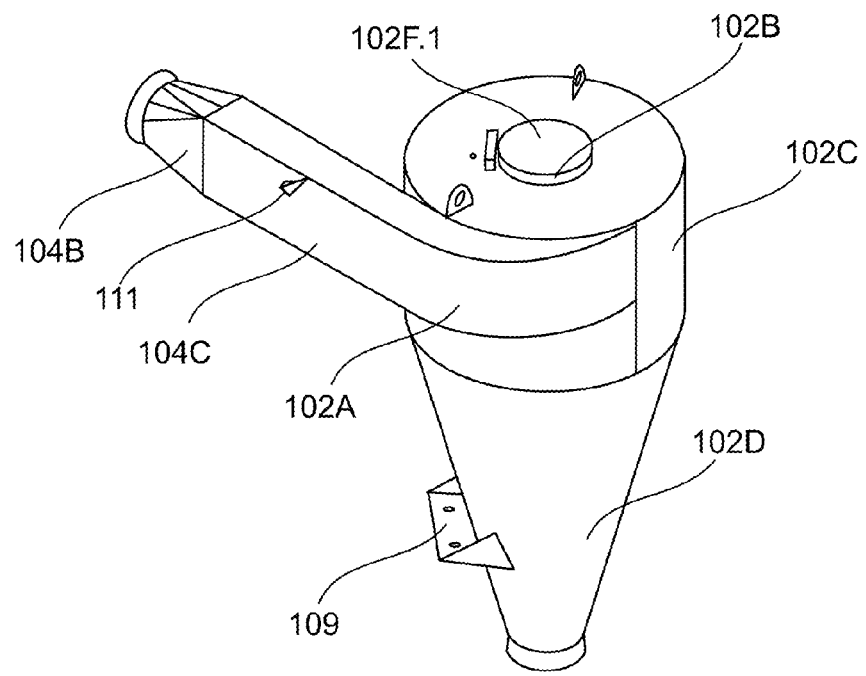
FIGS. 4a to 4e are simplified block diagrams illustrating a perspective view, a top view, a front view, a side view, and a bottom view, respectively, of the dust collector of the particulate loader according to an embodiment of the invention.
Figure 4B:
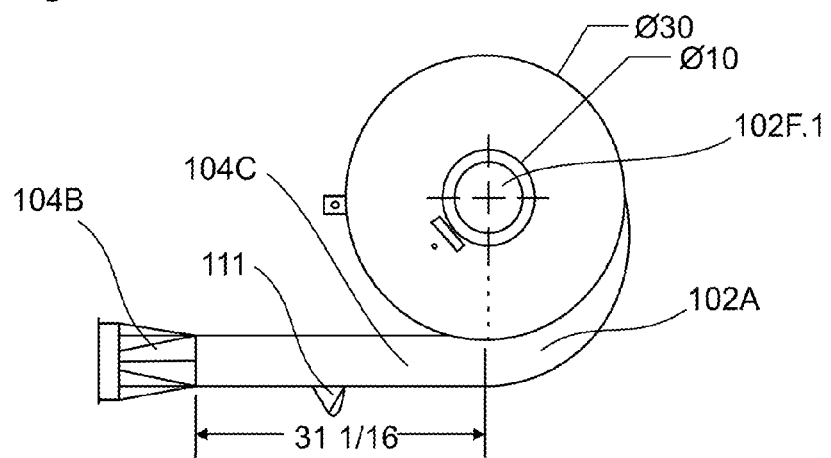
Figure 4C:
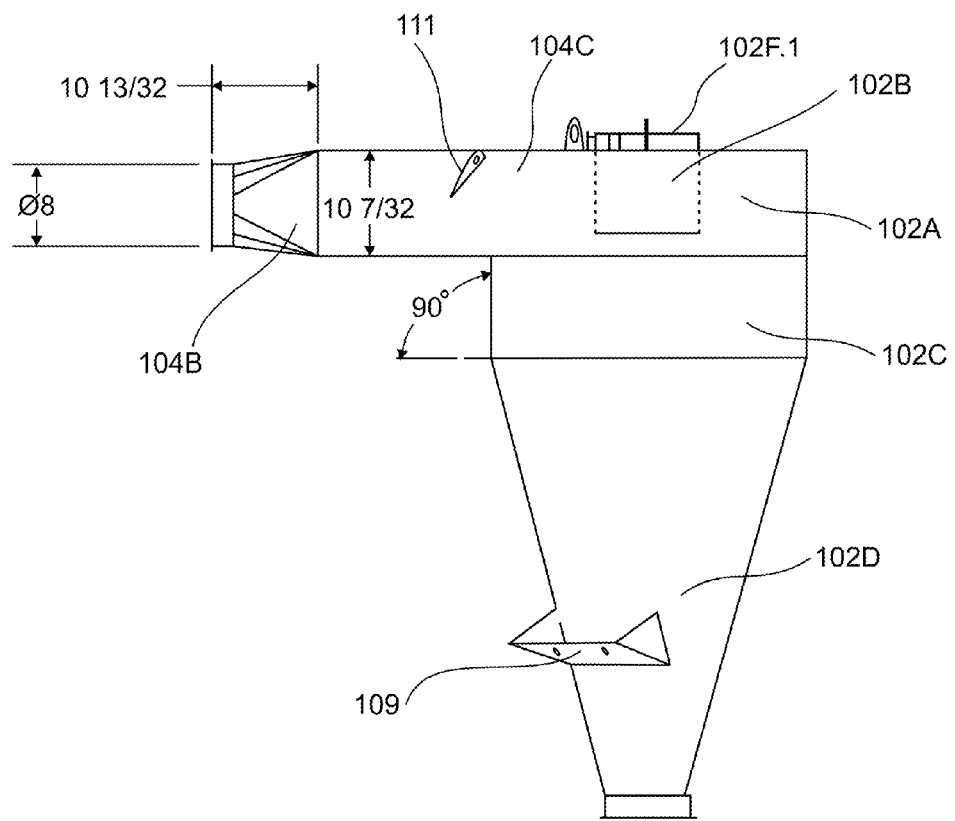
Figure 4D:
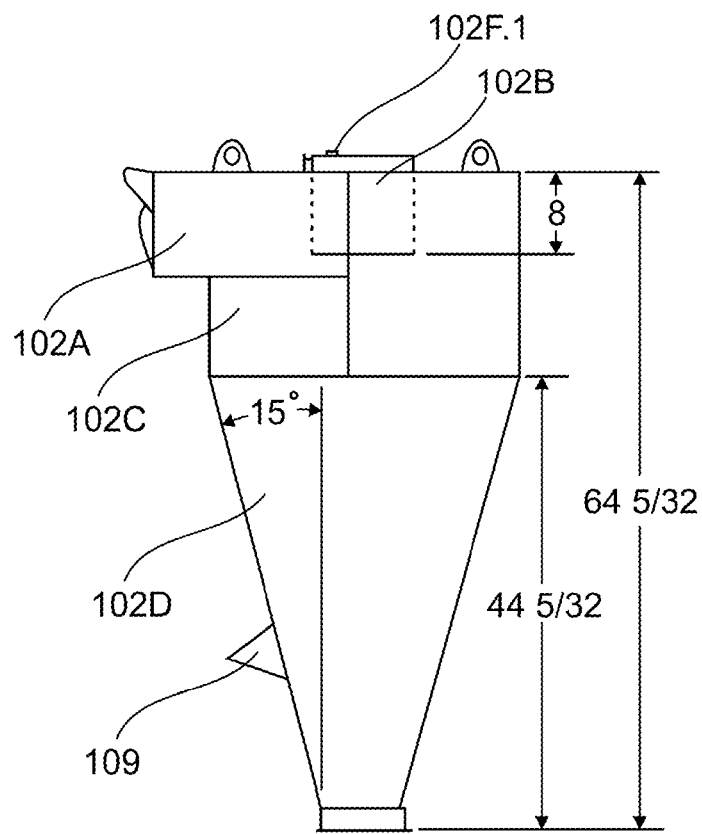
Figure 4E:
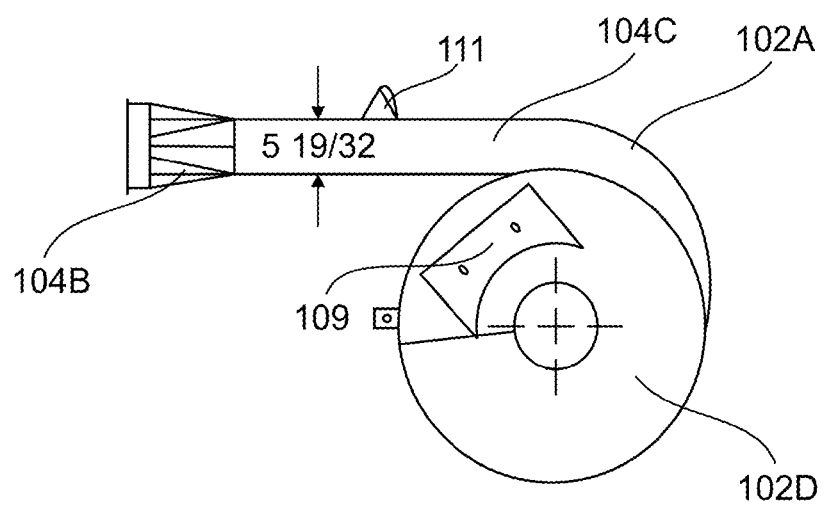
Figure 4F:
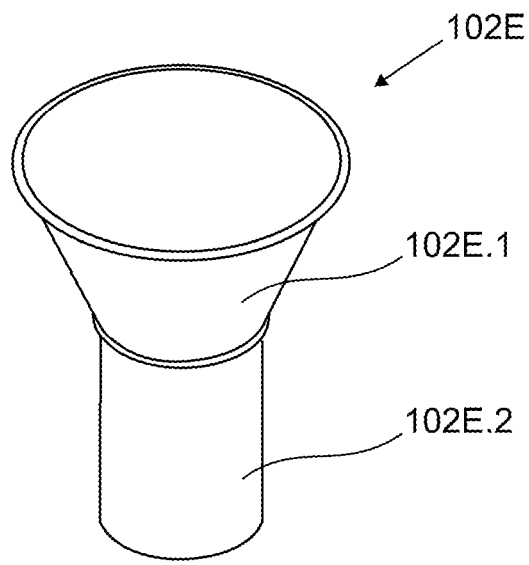
FIGS. 4f and 4g are simplified block diagrams illustrating a perspective view and a side view, respectively, of the cyclone dust outlet element of the particulate loader according to an embodiment of the invention.
Figure 4G:
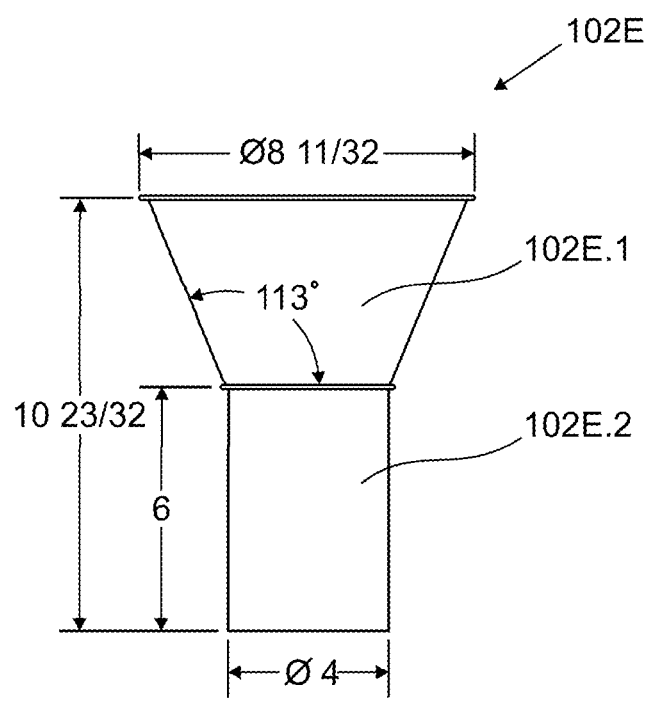

Alternatively, discharge of the dust 122 from the cyclone 102 while substantially maintaining a pressure difference between ambient pressure P0 and lower pressure P1 inside the conical section 102D of the cyclone 102 is enabled by providing a valve mechanism 106, as illustrated in FIGS. 3a to 3c. Valve inlet 106A of the valve mechanism 106—in one case, a duckbill trickle valve—is connected to the cyclone dust outlet 102E. Duckbill rubber sleeve 106C of the valve mechanism 106 is held closed by the pressure difference, as illustrated in FIG. 3b. As collected dust 122 builds up above the duckbill rubber sleeve 106C, the same is forced open due to the weight of the accumulated dust 122 and the dust 122 is discharged through valve outlet 106B, as illustrated in FIG. 3c. After discharging the dust 122 the duckbill rubber sleeve 106C re-closes automatically due to the pressure difference. The opening of the duckbill rubber sleeve 106C can be adjustable, for example, using springs 106D inserted in the sides of the duckbill rubber sleeve 106C which are adjusted via thumbscrews 106E. Use of the springs 106D combined with the thumbscrews 106E provides simple adjustment during operation, for example, after initial start or to enable a substantially continuous discharge of the dust 122 in cases when there is a substantial amount of dust separated by the cyclone 102. The duckbill trickle valve may be preferred since it simple, does not require lubrication and easy to adjust. The trickle valve 106 is available as an off-the shelf duckbill trickle valve, for example, Vacu-Valve® Platypus—manufactured by Aerodyne.

The valve mechanism 106 is employable for operating the cyclone 102 in absence of the preloaded cyclone air outlet cover 102F, as well as in combination therewith.

The particulate loader 100 can be provided on a mobile device such as, for example, a trailer 40 which is towable by means of a conventional tung 42 and hitch assembly. The trailer 40 comprises a frame structure 44 having wheels 46 conventionally mounted thereto by single or multiple axles, as well as the various components of the particulate loader 100. Further, the particulate loader 100 can be a high capacity particulate loader for transferring, for example, 4000-10,000 bu/hr. of grain, fitted on a trailer 40 having a transport width of approximately 8', a transport height of approximately 8'5", a transport length of approximately 12', and a transport weight of approximately 3000 lbs, i.e. dimensions within the limits for using public roads.

To ensure compactness and ease of transport of the particulate loader and transfer apparatus 100, the cyclone 102 can be placed substantially at level with the air-particulates separating chamber 2 and the air vacuum pump 6, resulting in the valve outlet 106B being placed a predetermined distance above ground such that removal of the collected dust 122 is facilitated by enabling to place a bucket or a conveying mechanism under the valve outlet 106B.

The dust collector is designed using standard engineering technologies known to one skilled in the art such as, for example, fluid dynamics based on, for example, rate and pressure of the exhaust air stream 120; amount, size and density of the dust particles to be separated. The dust collector can be designed with the objective that a sufficient amount of the dust is separated from the exhaust air stream while suction loss due to the exhaust air flow through the cyclone 102 is minimized. The dust collector is made of a substantially abrasion resistant material such as, for example, steel or aluminum sheets using standard metalworking technologies such as, for example, cutting, bending, and welding. The various components are mounted using standard metal fitting technology such as, for example, fitting flanges and screw bolts and/or metal screws.

In order to facilitate cleaning access into the cyclone 102 can be provided by, for example, enabling removing of the top of the cyclone body 102C, removable mounting the cyclone body 102C to the conical section 102D, providing an access door, or a combination thereof.

The exhaust conduit 104 can comprise an elbow section 104A—having a circular cross section—mounted to exhaust outlet 24 of the air vacuum pump 6. A converting section 104B is connected to the elbow section 104A and—after changing to a rectangular cross section—to rectangular conduit section 104C which is connected to the cyclone inlet 102A. The exhaust conduit 104 can be designed having an increasing cross section in the direction of the exhaust air flow, thus resulting in a reduced speed of the airflow when entering the cyclone 102. The exhaust conduit 104 is made of, for example, standard sheet material tubing with the sections being connected in a conventional manner.

The cyclone 102 can be removable or removably mounted to the frame structure 44 of the trailer 40 via support 108 which is mounted to the frame structure 44 and to support 109 mounted to a bottom portion of the conical cyclone section 102D in a conventional manner using, for example, fitting flanges and screw bolts and/or metal screws. The top portion of the dust collector can be removable or removably secured via lug 111 mounted to conduit section 104C and support 110 to a bottom portion of the tubular auger housing 12 in a conventional manner using, for example, fitting flanges and screw bolts and/or metal screws.

FIGS. 4a to 4g illustrate the dust collector implemented in the mobile high capacity particulate loader 100 described hereinabove with dimensions in inches.

The present invention has been described herein with regard to certain embodiments. However, it will be obvious to persons skilled in the art that a number of variations and modifications can be made without departing from the scope of the invention as described herein.

What is claimed is:

1. A particulate loader for transferring particulates comprising:
an air-particulates separating chamber for separating particulates from an air stream, the air-particulates separating chamber having an inlet conduit;
a suction mechanism connected to the air-particulates separating chamber for providing a suction thereto for removing air and dust from the air-particulates separating chamber via an exhaust outlet;
a conveying mechanism for conveying the separated particulates from the air-particulates separating chamber to a remote location; and
a cyclone for separating and collecting the dust from the air exhausted by the suction mechanism, the cyclone having a cyclone inlet connected to the exhaust outlet of the suction mechanism, an air outlet for discharging the air after separating the dust therefrom, and a dust outlet for discharging the dust separated from the air.

2. The particulate loader according to claim 1 comprising a preloaded cyclone air outlet cover for covering the air outlet, the preloaded cyclone air outlet cover being movable between a closed position and an open position.

3. The particulate loader according to claim 2 wherein a preload of the preloaded cyclone air outlet cover is configured such that, during operation, an air pressure inside the cyclone is maintained at a level sufficient for discharging the dust.

4. The particulate loader according to claim 2 wherein the preload is adjustable.

5. The particulate loader according to claim 1 comprising a dust outlet element removably mounted to the dust outlet of the cyclone, the dust outlet element having a dust outlet opening that is dimensioned for discharging a substantial amount of the dust separated during operation while substantially preventing ambient air from being drawn into the cyclone therethrough.

6. The particulate loader according to claim 1 comprising a mobile device having the air-particulates separating chamber, the suction mechanism, the conveying mechanism, and the cyclone mounted thereto, the particulate loader being a high capacity particulate loader, and the mobile device having dimensions within limits for transporting using public roads.

7. The particulate loader according to claim 6 wherein the mobile device comprises a trailer.

8. The particulate loader according to claim 1 comprising a valve mechanism connected to the dust outlet of the cyclone.

9. The particulate loader of claim 1, wherein the suction mechanism is operatively positioned between the air-particulate separation chamber and the cyclone.

10. The particulate loader of claim 2, further comprising at least one of a compression spring, a tension spring, or a torsion spring coupled to the preloaded cyclone air outlet cover to preload the preloaded cyclone air outlet cover.

11. The particulate loader of claim 2, further comprising a weight mounted to the preloaded cyclone air outlet cover to preload the preloaded cyclone air outlet cover.

12. The particulate loader of claim 8, wherein the valve mechanism is a duckbill trickle valve.

13. The particulate loader of claim 1, wherein the separating chamber has a perforated restriction device positioned therein.

14. The particulate loader of claim 13, wherein the perforated restriction device is configured to separate the particulate material from the air and the dust, which are removable from the separating chamber by the suction mechanism.

15. The particulate loader of claim 1, wherein the cyclone further comprises a preloaded air outlet cover coupled to the air outlet or a valve mechanism coupled to the dust outlet, wherein the preloaded air outlet cover or valve mechanism is operable to control an air pressure within the cyclone and prevent ambient air from being sucked in through the dust outlet.

* * * * *

UNITED STATES PATENT AND TRADEMARK OFFICE
CERTIFICATE OF CORRECTION

| | |
|---|---|
| PATENT NO. | : 9,205,999 B2 |
| APPLICATION NO. | : 14/157827 |
| DATED | : December 8, 2015 |
| INVENTOR(S) | : Kent Gregory Woods, Joseph Robert Parisien and Paul Kerr |

Page 1 of 1

It is certified that error appears in the above-identified patent and that said Letters Patent is hereby corrected as shown below:

Title page

Item (73) Assignee, reads "AG GROWTH INDUSTRIES PARNERSHIP, Winnipeg, Manitoba (CA)"

It should read:

-- AG GROWTH INDUSTRIES PARTNERSHIP, Winnipeg, Manitoba (CA) --

Signed and Sealed this
Eighth Day of March, 2016

Michelle K. Lee
*Director of the United States Patent and Trademark Office*